(12) United States Patent
Linge et al.

(10) Patent No.: US 7,057,153 B2
(45) Date of Patent: Jun. 6, 2006

(54) MULTIPLE SENSING AUTOMATIC LIGHTING SYSTEM FOR PERSONAL SAFETY

(75) Inventors: Julie E. Linge, Winnipeg (CA); John Kun, Winnipeg (CA)

(73) Assignee: T.J. Feetures Inc., Winnipeg (CA)

( * ) Notice: Subject to any disclaimer, the term of this patent is extended or adjusted under 35 U.S.C. 154(b) by 2 days.

(21) Appl. No.: 10/841,492

(22) Filed: May 10, 2004

(65) Prior Publication Data

US 2004/0227064 A1 Nov. 18, 2004

Related U.S. Application Data

(60) Provisional application No. 60/469,397, filed on May 12, 2003.

(51) Int. Cl.
*G06M 7/00* (2006.01)
*H01J 40/14* (2006.01)

(52) U.S. Cl. .................. 250/221; 250/222.1; 340/541
(58) Field of Classification Search ............ 250/214 R, 250/221, 222.1, 231.1; 340/541–542, 566, 340/615
See application file for complete search history.

(56) References Cited

U.S. PATENT DOCUMENTS

| | | | |
|---|---|---|---|
| 5,291,014 A * | 3/1994 | Brede et al. ......... 250/227.21 |
| 5,309,145 A * | 5/1994 | Branch et al. ............. 340/540 |
| 5,396,720 A | 3/1995 | Hwang et al. |
| 5,408,764 A | 4/1995 | Wut |
| 5,416,675 A | 5/1995 | DeBeaux |
| 5,500,635 A | 3/1996 | Mott |
| 5,834,765 A | 11/1998 | Ashdown |
| 5,866,987 A | 2/1999 | Wut |
| 5,996,383 A | 12/1999 | Adelmeyer et al. |
| 6,104,140 A | 8/2000 | Wut et al. |
| 6,175,196 B1 | 1/2001 | Ragner et al. |
| 6,527,408 B1 | 3/2003 | Korenek, Jr. |
| 6,642,667 B1 | 11/2003 | Avis |
| 6,682,202 B1 | 1/2004 | Wong |
| 2004/0157612 A1* | 8/2004 | Kim ........................... 455/445 |
| 2005/0179541 A1* | 8/2005 | Wolfe ..................... 340/539.22 |

* cited by examiner

*Primary Examiner*—Stephone B. Allen
*Assistant Examiner*—Patrick J. Lee
(74) *Attorney, Agent, or Firm*—Adrian D. Battison; Michael R. Williams; Ryan W. Dupuis

(57) ABSTRACT

The disclosed intelligent lighting system is designed to provide automatic illumination when the device is in motion in any direction and ambient light is below a prescribed level. In its intended format illumination will generally be in a direction forward of the user so as to provide useful for the user illumination when it is dark. The device consists of a connection to a power source, a motion sensor, a photocell, driving and delay circuitry and an illuminating element.

3 Claims, 2 Drawing Sheets

MULTIPLE SENSING AUTOMATIC LIGHTING SYSTEM FOR PERSONAL SAFETY

FIELD OF THE INVENTION

This application claims priority under 35 U.S.C. 119 from U.S. Provisional Application Ser. No. 60/469,397 filed May 12, 2003.

The present invention relates to an automatic lighting system that activates and de-activates lights based on motion and ambient light levels.

BACKGROUND

A wide variety of lighting systems exist today as applied with bicycles, bicycle helmets, and other action sports equipment, as well as other consumer goods, including footwear. Most of these lighting systems utilise manual switches to activate and deactivate the lights. A standalone hands-free system that works on environmental variables of motion and ambient light levels does not exist.

Some comparable inventions exist. An example of an illuminated helmet is disclosed in U.S. Pat. No. 5,416,675 (DeBeaux). This patent describes circuitry that triggers LEDS to come on based on two actuating switches. The first actuating switch is ambient light. The second switch however is triggered when the user dons the helmet. Thus motion is not represented.

Two other examples of lighting systems are shown in U.S. Pat. No. 5,834,765 (Ashdown) and U.S. Pat. No. 5,996,383 (Adelmeyer et al). These patents disclose examples of sensing ambient light levels in combination with motion sensing. However, the motion sensing detects external movement in a general area around the device as opposed to detecting actual movement of the device.

U.S. Pat. No. 6,682,202 (Wong) describes several novelty devices containing LEDS triggered by a spring switch however there is no consideration of ambient light levels when triggering the LEDS.

In U.S. Pat. No. 6,527,408 Korenek describes a motion activated LED light switch which again has no consideration for ambient light levels.

In U.S. Pat. No. 6,175,196 Ragner et al. describe a photo sensitive illuminated skate wheel. The Ragner et al. (2001) invention is: (1) specifically applied with rotating devices and the acceleration sensor is premised on centrifugal force; (2) the batteries are sealed within the invention making the invention disposable once the batteries expire; and (3) the direction and intensity of the illuminating device is intended solely as a safety light to alert others to the users' presence and not for the illumination of the individual.

In U.S. Pat. No. 6,642,667 Avis describes a motion and ambient light sensitive switch to disable flashlight output. This is a completely different outcome for the intended technology disclosed within.

Numerous applications of footwear lighting systems exist. Most utilize pressure sensors as a means for activating the light sources when downward pressure is sufficient. In U.S. Pat. No. 5,500,635 Mott describes the use of piezoelectric materials as a means for triggering electric circuits controlling lights or other devices embedded into footwear. No mention is made with respect to ambient light levels as a determining factor for triggering the light output.

In U.S. Pat. Nos. 5,408,764 and 6,104,140 Wut describes a motion activated illuminating footwear and light module. This system again does not make any consideration for ambient light levels. In U.S. Pat. No. 5,866,987 Wut considers ambient light as a variable to trigger his light module however his fundamental design differs greatly from the one described herein. The system described in U.S. Pat. No. 5,866,987 will not provide a constant output of light regardless of the motion of the wearer.

In U.S. Pat. No. 5,396,720 Hwang et al describe a 2 stage switch for a lighting element for a shoe. This design considers ambient light as a triggering variable for the lights however the design is limited to footwear where there is significant impact on the micro switch to trigger the primary circuitry. Simple motion of the shoe when ambient light levels are low will not necessarily trigger the light source.

SUMMARY

According to the present invention there is provided an automatic lighting system that uses the environmental variables of: (1) motion and; (2) ambient light levels. The LEDS are activated when motion and low light is detected. The lighting system will also terminate the LEDS if motion is ceased and/or environmental light exceeds the prescribed threshold. The invention has many market applications.

An automatic, intelligent lighting system capable of activating lights in the presence of motion and low ambient light can either provide illuminating light in front of a person, or a safety light in behind a user. The automatic lighting system can also be used as a stand-alone product, or in concert with existing products. Therefore four potential applications exist: (1) in front of the user as a stand alone product; (2) in front of the user in concert with other products; (3) behind the user as a stand alone product; and (4) behind the user in concert with other products.

Examples of specific market applications for the lighting system are as follows. The lighting system can be attached to wheelchairs and/or walkers to provide illumination to the front, or as a safety light behind the user. The lighting system can be attached to the boot of a cross-country skier to provide forward illumination. Likewise, the lighting system can be applied as bicycle lights and bicycle helmet lights. The present invention would eliminate the need for manual control of bicycle accessories such as "flashers", or serve as a stand-alone product attached directly to helmets or bicycles. Other examples included applying the system as an accessory to in-line skates or on baby strollers. Children's toys such as "ride-in" vehicles can also utilise the lighting system. The above examples are simply examples of application and do not represent an exhaustive or complete list of market applications.

According to the present invention a plurality of LED lights are connected to a circuit board. A wide range of LEDS are capable of function with the circuit board, and the specific array of LEDS used depends on the market application the lighting system is designed for. A connection to a self-contained or external power source for the assembly is also part of the invention. The power source is dependent on the market application that lighting system is designed for. An electric circuit connecting the power source to the LEDS and the circuit with a means for activating the light source is the invention.

Preferably the circuit includes a motion sensor arranged to activate/terminate the LEDs based on prescribed measures.

Preferably the circuit includes a light sensor arranged to activate/terminate the LEDS based on prescribed measures.

Preferably the LEDS are deactivated after a prescribed period of time of non-acceleration and/or environmental light levels above the prescribed threshold.

BRIEF DESCRIPTION OF THE DRAWINGS

In the accompanying drawings, which illustrate an exemplary embodiment of the present invention.

DETAILED DESCRIPTION

Referring to the accompanying drawings, there is illustrated a lighting system 1 for use with a wide variety of market applications, including, but not limited to athletic equipment such as roller blades, bicycles, helmets, bicycle accessories, skis and ski boots. The lighting system can also be used on non-athletic equipment such as baby strollers, wheelchairs, mobility assist devices and the like. The lighting system can also be incorporated with children's toys. The lighting system is arranged to provide illumination for a user to illuminate the area in front of the user. The lighting system is also able to provide illumination to the rear of the user so as to make the user more visible to people behind. The lighting system is arranged to be powered when the ambient light levels are below a set level, and the device is moving faster then a prescribed acceleration.

Figure 1:
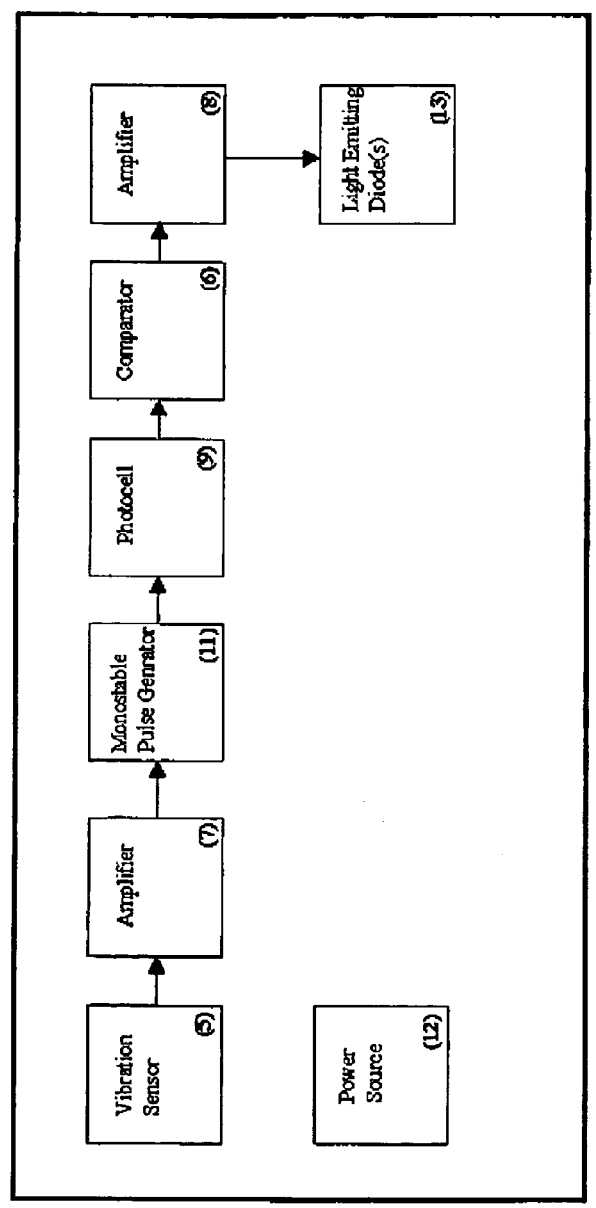
FIG. 1 is a block diagram of the preferred embodiment.

FIG. 1 is a block diagram of the preferred embodiment. The arrows show the natural path of the electric signals. The circuit has a vibration sensor (5) which produces a voltage proportional to the amount of acceleration it is experiencing. The voltage is transmitted to an amplifier (7) where the voltage is amplified by an amount such that sufficient motion on the vibration sensor will give an output signal high enough to trigger a monostable pulse generator (11). The monostable pulse generator produces an output pulse of a prescribed duration regardless of the duration of the triggering input. It is capable of being re-triggered such that each qualifying signal from the vibration sensor will start the output timing cycle over again. A photocell (9) divides the input signal by an amount inversely proportional to the incident light intensity (ambient light) and transmits this to a comparator circuit (6). If the signal output from the photocell block (9) is of a significant amplitude the comparator transmits a high signal to the amplifier (8). This would imply a significant amount of motion coupled with low ambient light levels. The amplifier block (8) produces a signal capable of turning on one or more LEDs (13). The circuit contains an external or imbedded power source (12) to provide power to all of the circuitry shown in blocks (5) to (13).

Figure 2:
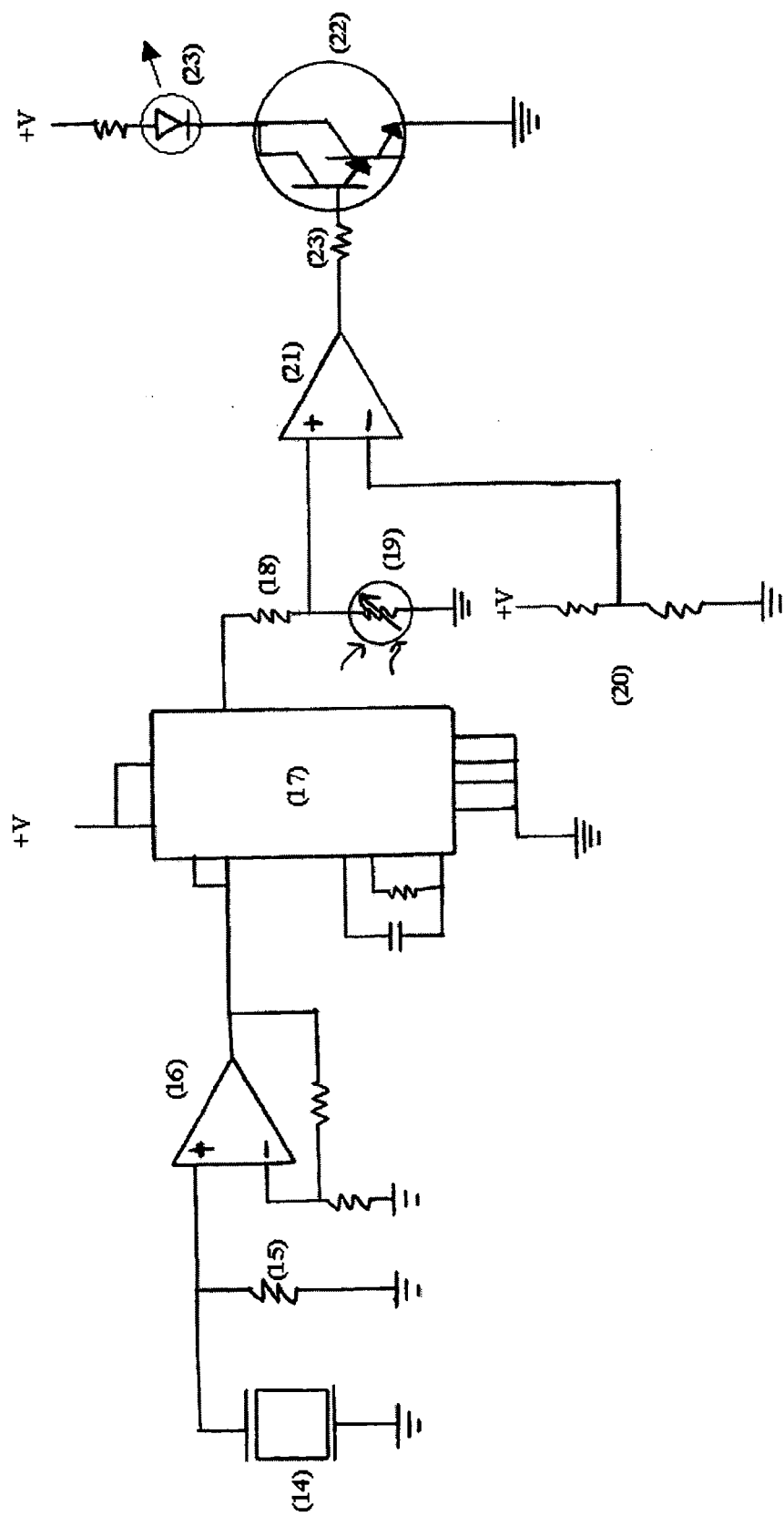
FIG. 2 is the detailed schematic of the preferred embodiment.

FIG. 2 is a complete schematic representation of the preferred embodiment. Sensor 1 (14) is a piezoelectric vibration sensor which produces a voltage proportional to the acceleration imparted on it. It is non directional and will give a signal regardless of the plane of motion it is moving in. It is highly suited for this application because of its sensitivity to motion and can therefore be also construed as a motion sensor. The sensor (14) is connected to a resistor (15) and forms the input of an amplifier (16). The amplifier magnifies the voltage across the sensor (14) sufficiently such that the output can trigger the monostable circuitry (17) when there is sufficient motion imparted to the sensor (14). The monostable circuit is configured in such a manner so as to be re-triggerable and to provide a constant duration output after each trigger caused by motion on the sensor (14). The output of the monostable (17) drives a resistor divider network made up of a fixed resistor (18) and a photo sensitive resistor (19). A resistor divider pair (20) generates a fixed voltage applied to comparator (21). Comparator (21) determines if the output of the resistor photocell network (18–19) is higher than the fixed threshold value of (20). If it is then the output is set to a high level which turns on transistor (22) through resistor (23) When transistor (22) is properly biased LED1 (23) is illuminated. The net affect as described logically is that when motion is imparted on the vibration sensor (14) and the photocell (19) is sufficiently dark the LED will light up for a period of several seconds unless the photocell (19) is illuminated with sufficient light. If motion is continuously imparted on sensor (14) and the photocell (19) is continuously dark then the LED will remain illuminated and provide a constant beam of light.

It is generally accepted that the circuit shown in FIG. 2 will be powered by a suitable external power source such as (but not limited to) two 1.5 volt batteries connected in series providing +V as shown in FIG. 2. It is also generally accepted that there can be one or more LEDS driven by the circuit shown in FIG. 2. Many systems of motion sensing exist and the use of piezoelectric sensors to transduce motion gives the most universal results. That being a quality signal representing motion in any direction. Certain applications of this patent may also use inertial spring based sensors or simple pressure sensitive switches to sense motion. Photosensitive resistors are a cost effective means to transduce ambient light conditions however several other products can accomplish the same task such as phototransistors, photodiodes and photovoltaic cells.

The lighting system, as illustrated in FIG. 2, is mounted on a helmet 15. A first set of LED lights 17 is positioned on the front side of the helmet for illuminating in the direction of travel. A second set of LED lights 19 having a lower level of illumination are positioned on the rear of the helmet to ensure the wearer is seen in low light or night time situations.

While one embodiment of the present invention has been described in the foregoing, it is to be understood that other embodiments are possible within the scope of the invention. The invention is to be considered limited solely by the scope of the appended claims.

The invention claimed is:

1. A device having an intelligent lighting system mounted thereon for providing illumination for a user of the device, the system comprising:

at least one LED;

a power source being arranged for powering the at least one LED;

and a control circuit arranged to activate and deactivate power to the at least one LED;

the at least one LED, the power source and the control circuit mounted on the device for movement therewith;

the at least one LED being arranged on the device to provide illumination of an area exterior to the device;

the control circuit consisting solely of:

a light sensor arranged on the control circuit such that the sensor acts to sense ambient light surrounding the device to detect a level of the ambient light;

a vibration sensor mounted in the control circuit on the device and arranged to detect movement of the device itself relative to its environment;

first circuit components responsive to the vibration sensor arranged to detect movement of the device relative to its environment above a predetermined level;

second circuit components responsive to the light sensor arranged to detect ambient light below a predetermined level;

third circuit components arranged to activate the power source to the at least one LED if the level of ambient light is less than the predetermined level of ambient light and the level of movement of the device relative to its environment is greater than the predetermined level of movement and arranged to deactivate the power source to the at least one LED after a prescribed period of time if either the level of ambient light is greater than the predetermined level of ambient light or the level of movement of the device relative to its environment is less than the predetermined level of movement;

such that the at least one LED is activated automatically without manual switching.

2. The system according to claim 1 wherein the first circuit components comprise a comparator and the third circuit components comprise a monostable pulse generator, the comparator and the monostable pulse generator being arranged such that, when an output voltage from the vibration sensor exceeds the predetermined level, the monostable pulse generator is arranged to produce an output pulse of a prescribed duration regardless of the duration of an input from the comparator.

3. The system according to claim 2 wherein the light sensor comprises a photocell which provides an output pulse and the second circuit components are arranged to divide the output pulse by an amount inversely proportional to the incident light intensity on the photocell and wherein there is provided a comparator for actuating the at least one LED in the event that the value of the divided output pulse is greater than a predetermined value indicative of an ambient light value less than said predetermined level.

* * * * *